United States Patent [19]

Williamson

[11] Patent Number: 5,454,217
[45] Date of Patent: Oct. 3, 1995

[54] PLANT HARVESTING MACHINE

[75] Inventor: Harry L. Williamson, Franklin, Ky.

[73] Assignee: De Cloet, Ltd., Ontario, Canada

[21] Appl. No.: 277,863

[22] Filed: Jul. 20, 1994

[51] Int. Cl.⁶ .................................................. A01D 45/16
[52] U.S. Cl. .............................. 56/27.5; 56/157; 56/182
[58] Field of Search ........................ 56/27.5, 327.1, 56/14.5, 153, 154, 155, 157, 181, 182, 185, 186; 414/26

[56] References Cited

U.S. PATENT DOCUMENTS

| | | |
|---|---|---|
| 1,134,184 | 4/1915 | Cook . |
| 1,134,206 | 4/1915 | King . |
| 1,573,020 | 2/1926 | Scruggs . |
| 1,999,638 | 4/1935 | Richards ................................. 56/27.5 |
| 2,495,874 | 1/1950 | Stula ...................................... 56/27.5 |
| 2,564,614 | 8/1951 | Sowers .................................. 56/27.5 |
| 2,693,070 | 11/1954 | Gaut et al. ............................. 56/27.5 |
| 2,836,950 | 6/1958 | Anderson .............................. 56/27.5 |
| 3,079,744 | 3/1963 | Newswanger ......................... 56/27.5 |
| 3,798,884 | 3/1974 | Middleton ............................. 56/27.5 |
| 3,855,762 | 12/1974 | Middleton ............................. 56/27.5 |
| 3,902,607 | 9/1975 | Middleton ......................... 56/27.5 X |
| 4,212,145 | 7/1980 | Middleton ............................. 56/27.5 |
| 4,353,200 | 10/1982 | Taylor, Jr. ............................. 56/27.5 |
| 4,444,001 | 4/1984 | Thurnau et al. ....................... 56/27.5 |
| 4,510,740 | 4/1985 | Foster .................................... 56/27.5 |
| 4,813,216 | 3/1989 | Day et al. ............................. 56/27.5 |

Primary Examiner—Stephen J. Novosad
Attorney, Agent, or Firm—Cushman, Darby & Cushman

[57] ABSTRACT

A plant harvesting machine is organized as a wheeled tricycle having a plant elevator, plant inverter assembly, and plant sticking assembly and designed to move along a row of tobacco plants and successively harvest the plants. The plant elevator includes a powered circular saw blade at its base that severs the stem of each successive plant as the plant is gripped between opposed spike chains of the plant elevator. The severed plant is carried by the plant elevator and transferred to a plant inverter assembly that inverts the plant. The plant inverter assembly includes a spike-plate and cooperating pressure plate assembly that inverted the plant. The pressure plate assembly includes a spring-loaded pressure plate that accommodates plant stems of different diameters and shapes as the plant is inverted. Another set of spike chains engage the inverted plant and impale the plant onto a spear-shoe that is carried on a wooden stick. When a full complement of plants is mounted on a stick, the stick and its plants are discharged from the plant harvesting machine.

10 Claims, 8 Drawing Sheets

PLANT HARVESTING MACHINE

BACKGROUND OF THE INVENTION

The present invention relates to a plant harvesting machine and, more particularly, to a plant harvesting machine designed to harvest tobacco plants.

Tobacco plants are typically grown in parallel rows and, at the time of harvesting, have a relatively thick, woody stem. When harvested by hand, the stem is severed adjacent the ground surface by the field worker. A 'stick' (typically wood) is forced through the stems of several of the harvested plants so that several plants then can be conveniently transported to and stored in a curing barn.

Since manual harvesting is a labor-intensive and relatively inefficient method of processing tobacco plants, various machine systems have been developed for the machine harvesting of the plants. For example, U.S. Pat. No. 4,813,216 to Day et al. discloses a tobacco harvester having a saw blade that severs the plant adjacent the ground surface and a conveyor-type elevator which then elevates the severed plant. An opposed pair of inversion disks grip and invert the severed plant. The stem of the inverted plant is then notched to facilitate placement of the notched stem in a holding bar.

SUMMARY OF THE INVENTION

In view of the above, it is an object of the present invention, among others, to provide a plant harvesting machine having improved plant handling capability, including an improved plant inverting mechanism.

It is another object of the present invention to provide a plant harvesting machine that is well suited for the efficient harvesting of tobacco plants.

In accordance with the present invention, a plant harvesting machine well suited for the harvesting of tobacco plants includes a wheeled chassis having a plant elevator designed to move along a row of tobacco plants that are to be harvested. The plant elevator includes a powered saw blade at its base that servers the stem of each successive plant in the row. The severed plant is gripped between two adjacent spiked chains of the plant elevator and is carried by the spiked chains to and transferred to a plant inverter assembly that includes a spiked plate and cooperating self-adjusting pressure plate that inverts each successive plant. Another set of spike chains engages the inverted plant and impales the inverted plant onto a pointed shoe that is carried on a conventional wooden stick. After a stick accepts its full complement of plants, the stick and its plants are discharged from the harvesting machine.

The present invention advantageously provides a plant harvesting machine that is simple in design and which efficiently harvests tobacco plants and mounts them on a stick for subsequent handling.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
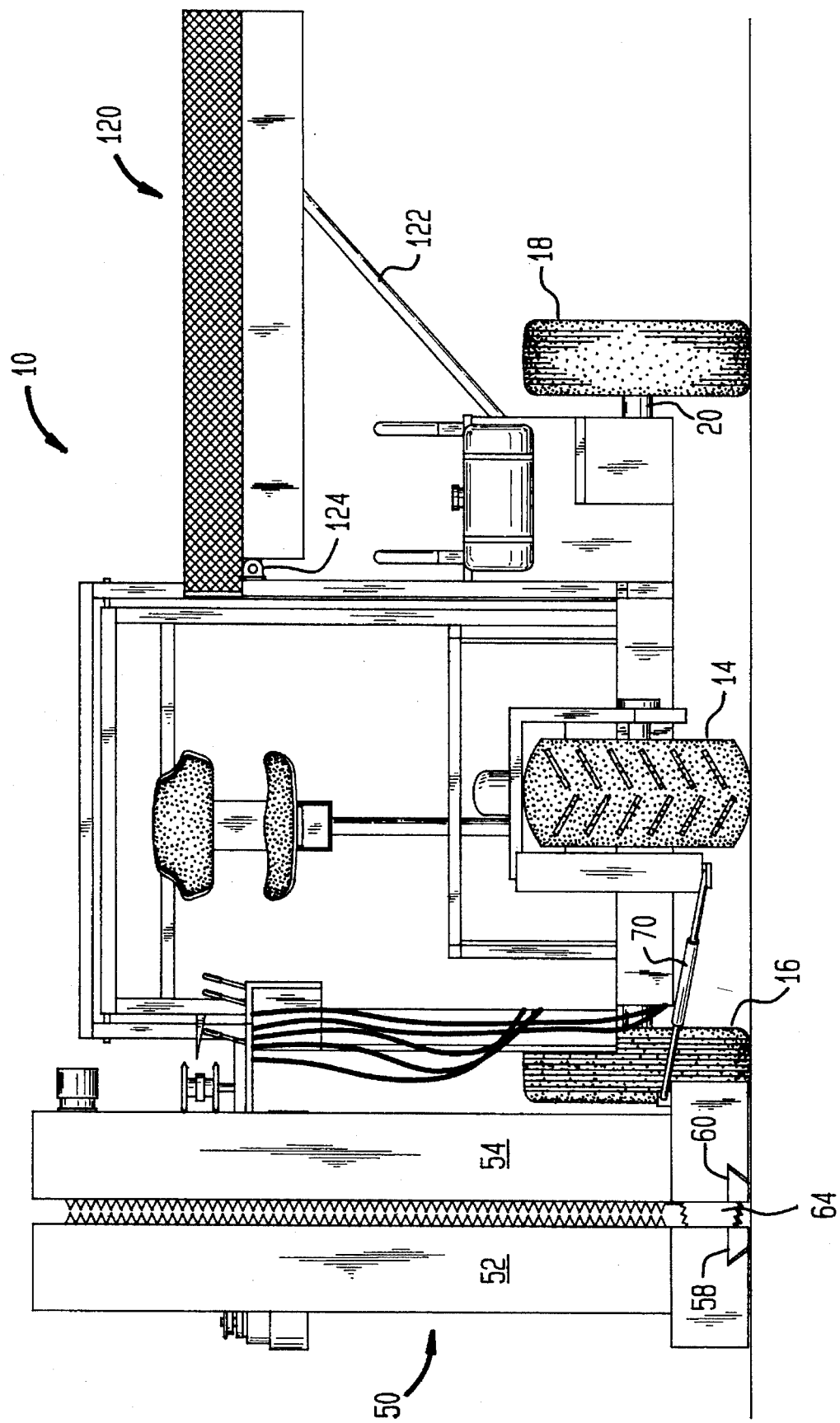
FIG. 1 is a front elevational view of a plant harvesting machine in accordance with the present invention.
Figure 2:
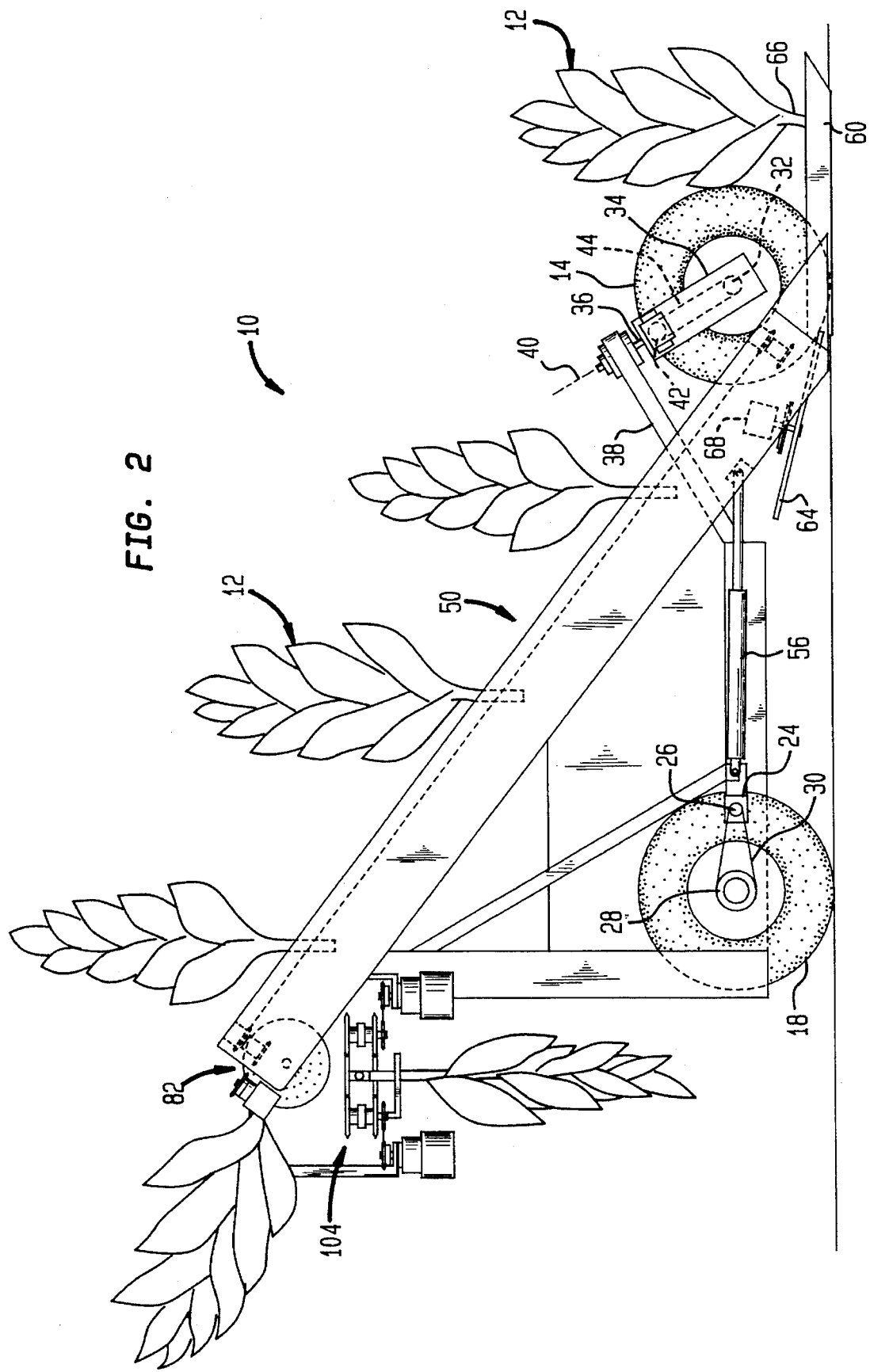
FIG. 2 is a side elevational view of the plant harvesting machine of FIG. 1 illustrating tobacco plants being transported along an elevator and inverted.
Figure 3:
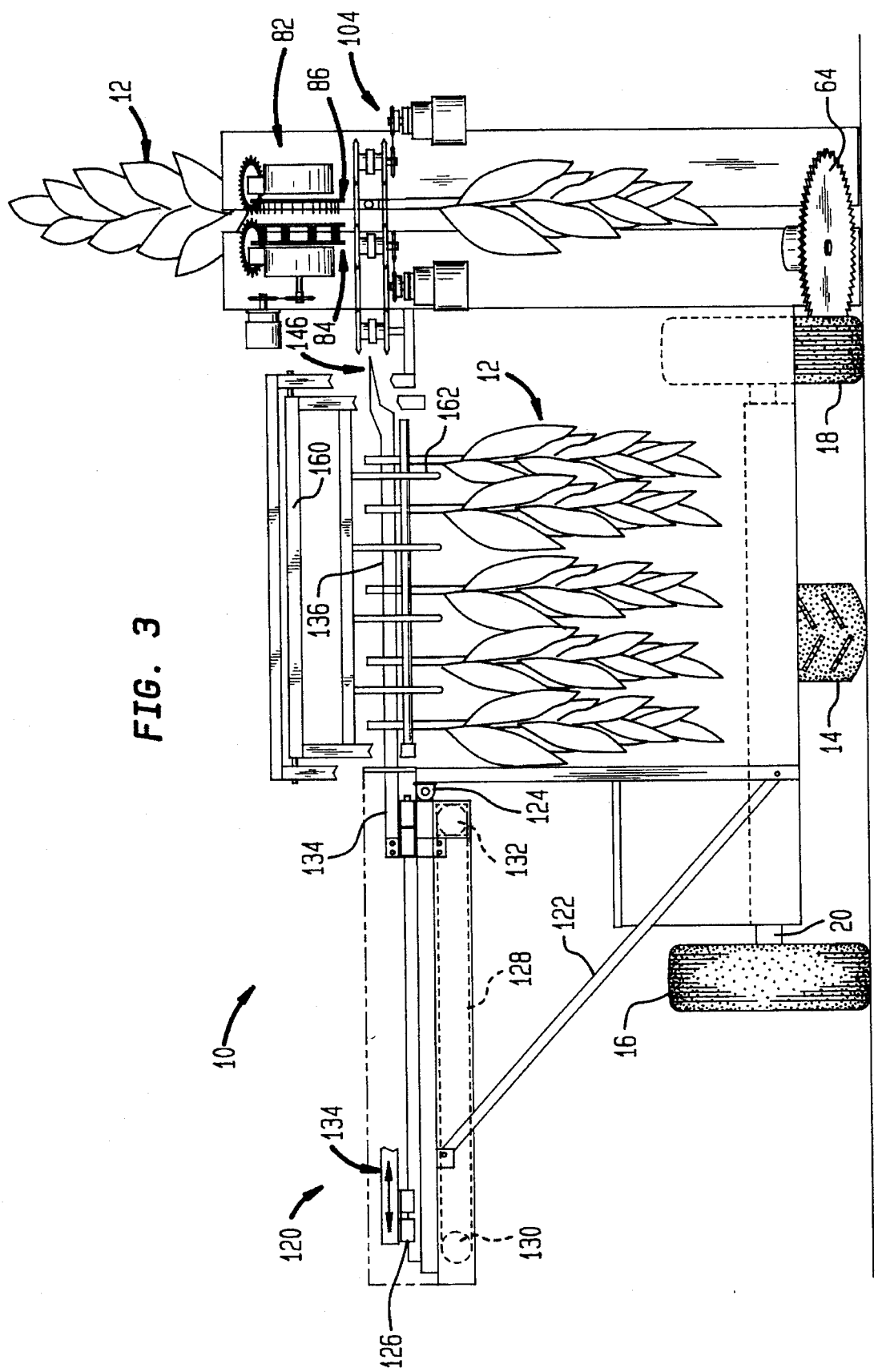
FIG. 3 is a rear elevational view of the plant harvesting machine of FIGS. 1 and 2 illustrating inverted tobacco plants being spiked.
Figure 4:
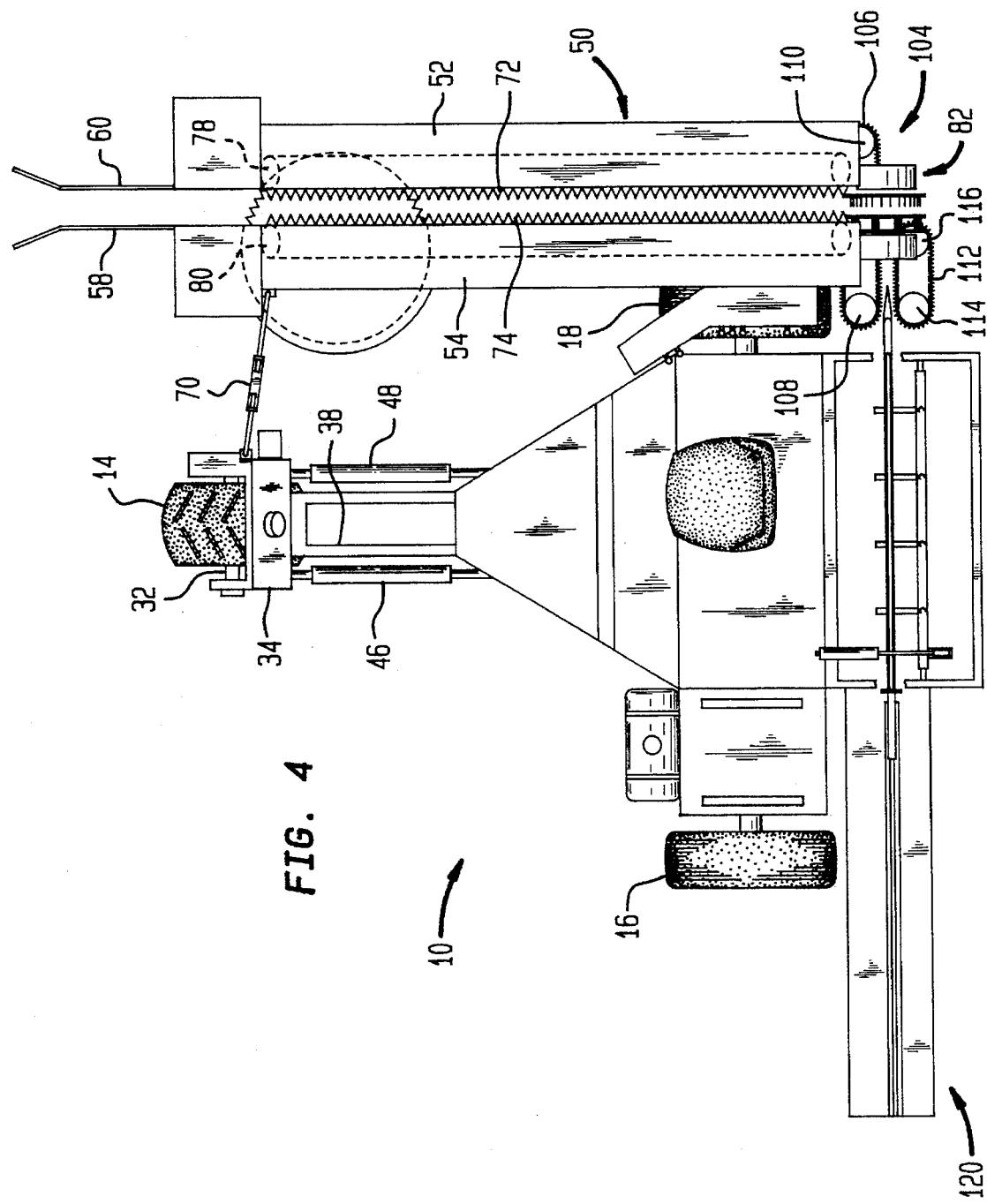
FIG. 4 is a top view of the plant harvesting machine of FIGS. 1, 2, and 3.

A plant harvesting machine in accordance with the present invention is shown in FIGS. 1–4 and designated generally therein by the reference character 10. As shown, the plant harvesting machine 10 is organized as a three-wheeled vehicle designed to move parallel to a row of tobacco plants 12 while sequentially harvesting the plants in that row. The plant harvesting machine 10 is fabricated as a welded chassis structure (unnumbered) that includes a forwardly located steerable front wheel 14 and two rear wheels, rear wheel 16 and rear wheel 18. The rear wheels rear wheel 16 and rear wheel 18 are mounted at opposite ends of a rear-wheel axle 20 carried by a lower frame member 22 (FIG. 3). A rear-wheel drive motor 24 is coupled to the rear-wheel axle 20 via a power transmission that, in the preferred embodiment, includes a drive sprocket 26 connected to the rear-wheel drive motor 24, a driven sprocket 28 connected to the rear-wheel axle 20, and a drive chain 30 connected therebetween. In the preferred embodiment, the various drive motors are hydraulically powered from a source of pressurized hydraulic fluid provided by a conventional hydraulic pump driven by an internal combustion engine (not shown). The steerable front wheel 14 is mounted on a front-wheel axle 32 carried in a steering fork 34 that is mounted in a steering strut 36 at the forward end of a steering arm extension 38. The steerable front wheel 14 is rotatable about a steering axis 40 to control the direction of movement of the plant harvesting machine 10. A front-wheel drive motor 42 is connected via a link belt 44 to the front wheel 14 to provide an all-wheel drive vehicle. As shown in FIG. 4, the steering fork 34 is controlled by a first steering cylinder 46 and a second steering cylinder 48. The operator of the plant harvesting machine 10 controls the flow of pressurized hydraulic fluid to one steering cylinder or the other to control the direction of movement of the machine.

A plant elevator 50 is located on the right side (from the perspective of the machine operator) of the plant harvesting machine 10 and functions to sever each successive plant a few inches above the local ground surface and transport the severed plant in an upright position to an elevated position. The plant elevator 50 includes opposed ramps, ramp 52 and ramp 54, that extend upwardly at an inclined angle (about 40°) from a lower, forward end to a rearward, elevated end. A hydraulic, elevation control cylinder 56 (FIG. 2) is connected between the lower end of the plant elevator 50 and the vehicle frame. The elevation control cylinder 56 is under the control the machine operator to control the elevation of the lower, forward end of the plant elevator 50 relative to the local ground surface. The plant elevator 50, at its forward end adjacent the ground surface, includes spaced guide plates, guide plate 58 and guide plate 60 (FIG. 5), that each have forwardly diverging portions and straight parallel portions that define an entry chute 62. As the plant harvesting machine 10 advances along a row of tobacco plants 12, the stem 66 of each tobacco plant 12 in the row will sequentially be embraced between the guide plate 58 and the guide plate 60 and be guided toward and into the entry chute 62. A circular saw blade 64 is mounted at the forward end of the plant elevator 50 (FIG. 2) and is designed to sever each plant stem 66 a few inches (2–3 inches) above the local ground surface. The saw blade 64 is secured to the rotatable shaft (unnumbered) of a saw drive motor 68 with the cutting teeth (unnumbered) of the saw blade 64 positioned to cut the stem 66 of each tobacco plant 12 at the rear portion of the entry chute 62. As shown in FIG. 2, the saw blade 64 is mounted at an acute angle relative to the local ground surface. The lower, forward end of the plant elevator 50 is connected to the steering fork 34 by a connecting strut 70 and is movably mounted to the vehicle frame at its upper end. Accordingly, the lower, forward end of the plant elevator 50 can be moved laterally in response to vehicle steering.

Figure 5:
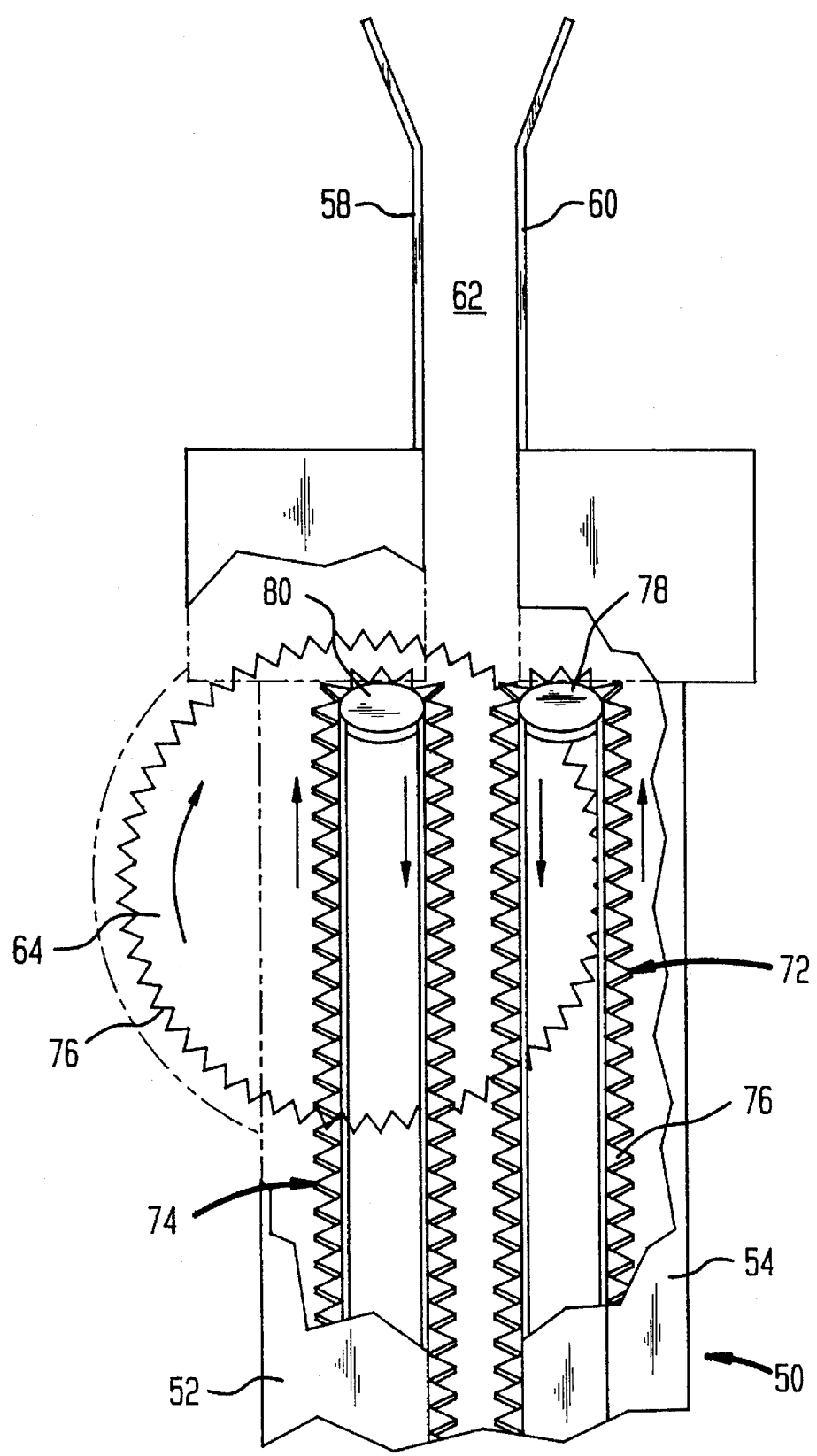
FIG. 5 illustrates the lower end of the elevator with selected portions thereof broken away for clarity.

As best shown in FIG. 4, the ramp 52 and the ramp 54 of the plant elevator 50 are spaced apart from one another. The ramp 52 houses a spike chain 72 and, in a similar manner, the ramp 54 houses a spike chain 74. As shown in FIG. 5, each spike chain includes tooth-like projections 76 that are designed to impale the stem 66 of each tobacco plant 12 as it is cut by the saw blade 64 at the rear portion of the entry chute 62. The spike chain 72 is entrained about a sprocket 78 at the lower end of the ramp 52 and, in a similar manner, the spike chain 74 is entrained about a sprocket 80 at the lower end of the ramp 54. As represented in dotted-line illustration in FIG. 2, the upper end of each respective spike chain is entrained about another pulley (unnumbered). A hydraulic motor (not shown) is connected to the spike chains so they are driven at about the same speed. The plant stems 66 of the tobacco plants 12 are gripped by the tooth-like projections 76 on the two opposed spiked chains as the saw blade 64 severs the plant stem 66 a few inches above the local ground level. It is important that the saw blade 64 and spike chains be relatively positioned so that the stem 66 of the tobacco plant 12 is engaged by the spike chains prior to the plant stem 66 being completely severed by the saw blade 64. As can be appreciated, the successively severed tobacco plants 12 are then transported upwardly in the plant elevator 50 as represented in FIG. 2.

Figure 6:
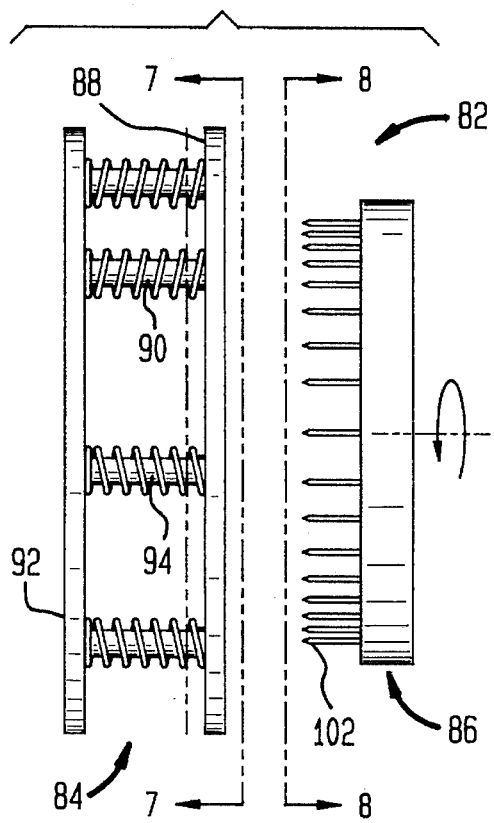
FIG. 6 is a side view of an inverter assembly with the components thereof spaced apart for reasons of clarity.
Figure 7:
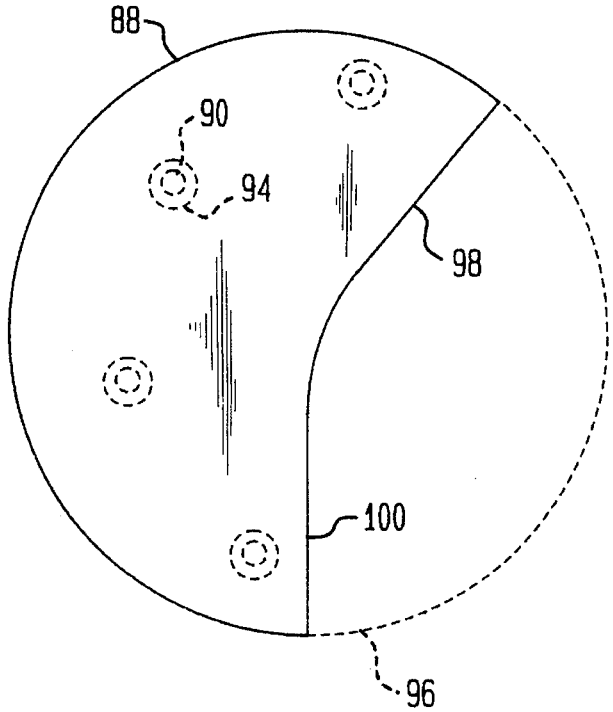
FIG. 7 is a frontal view of a spring-loaded pressure plate shown in FIG. 6 and taken along line 7—7 of FIG. 6.

A plant inverter assembly 82 is located adjacent the upper, rearward end of the plant elevator 50 and is designed to accept each severed tobacco plant 12 from the plant elevator 50 and substantially invert the plant. As shown in the lower right of FIG. 4 and in FIG. 6, the plant inverter assembly 82 is defined by a pressure plate assembly 84 that faces and is opposite to a rotatably driven spike plate 86. As shown in FIGS. 6 and 7, the pressure plate assembly 84 includes a part-circular pressure plate 88 that has a plurality of guide pins 90 extending from the backside thereof. The guide pins 90 are received within clearance bores formed in a base plate 92 that is secured to a suitable portion of the chassis frame. A helical spring 94, in compression, is mounted on each of the guide pins 90. The helical springs 94 resiliently bias the pressure plate 88 away from the base plate 92, and, in response to a force on the pressure plate 88 in the direction of the base plate 92 (i.e., leftward in FIG. 6), the pressure plate 88 will yield as shown in dotted-line illustration in FIG. 6. In the preferred embodiment, the pressure plate 88 is initially formed as a circular disc with a cut-away portion, identified as cut-away portion 96 in FIG. 7. The pressure plate 88 thus includes a leading edge 98 and a trailing edge 100.

Figure 8:
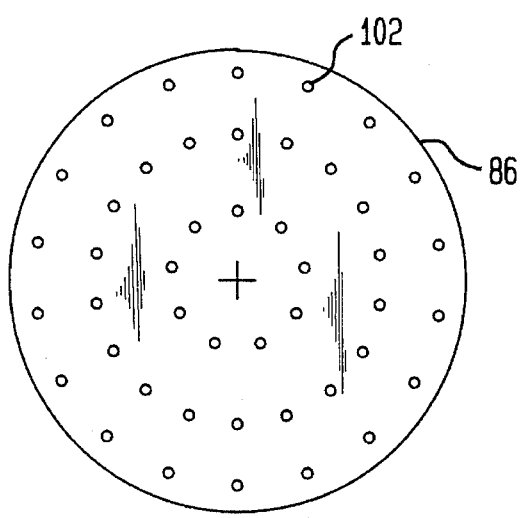
FIG. 8 is a frontal view of a spike plate shown in FIG. 6 and taken along line 8—8 of FIG. 6.

The spike plate 86 is preferably circular and has a plurality of pointed spikes 102 extending from the surface of the spike plate 86 facing the pressure plate 88. In the preferred embodiment, the spike plate 86 is fabricated from a circular steel disc with holes drilled in the desired pattern (FIG. 8). Thereafter, the pointed spikes 102, such as masonry-type nails, are inserted into the drilled holes and welded into place. The spike plate 86 is secured to the shaft of a hydraulic drive motor (not shown) and positioned so that the ends of the pointed spikes 102 are spaced from the surface of the pressure plate 88.

The plant inverter assembly 82 is positioned adjacent the upper end of the plant elevator 50 to successively receive each elevated tobacco plant 12 and invert the tobacco plant 12. Each tobacco plant 12 in the plant elevator 50 is gripped between the opposed tooth-like projections 76 of the spike chain 72 and the spike chain 74. The plant elevator 50 is generally tangentially aligned relative the plant inverter assembly 82 (FIG. 2) so that the stem 66 of each tobacco plant 12 is guided across the leading edge 98 of the pressure plate 88 as the pointed spikes 102 engage the plant stem 66 below that portion of the plant stem 66 gripped by the opposed spike chains 72 and 74. Preferably, a portion of the pressure plate 88 adjacent the leading edge 98 is bent away from the pointed spikes 102 to assist in guiding each successive tobacco plant 12 into the space defined between the converging leading edge 98 of the pressure plate 88 and the pointed ends of the pointed spikes 102. While not shown in any of the figures, the leading edge 98 of the pressure plate 88 (FIG. 7) can also be generously bevelled to present a relatively inclined surface to the plant stem 66. The cut-away portion 96 of the pressure plate 88 (as shown in FIG. 7) assists in guiding the stem 66 of the tobacco plant 12 into the clearance space between the pressure plate 88 and the points of the pointed spikes 102. The stem 66 of the tobacco plant 12 is impaled by the pointed spikes 102 and moved against the pressure plate 88 prior to the plant stem 66 being disengaged by the tooth-like projections 76 of the spike chain 72 and the spike chain 74. By the time the plant stem 66 is released by the opposed spike chains 72 and 74, the plant stem 66 is adequately engaged by the pointed spikes 102 and forced against the pressure plate 88 as the tobacco plant 12 is inverted. The plant stem 66 is effectively wiped about the surface of the pressure plate 88 by the pointed spikes 102 of the rotatably driven spike plate 86. The helical springs 94 allow the pressure plate 88 to resiliently yield toward and away from the base plate 92 to thus automatically accommodate or adjust to plant stems 66 of different diameters or shapes as the plant stems 66 slide against the surface of the pressure plate 88. Because of the helical springs 94, each plant stem 66 is forced against the pointed spikes 102 with approximately the same force.

The plant inverter assembly 82 is designed to transfer the inverted tobacco plant 12 to a lateral transfer assembly 104, shown in plan view in FIG. 4 and in side and rear view in FIGS. 2 and 3, respectively. The lateral transfer assembly 104 includes a first pusher chain 106 entrained about a sprocket 108, on the left in FIG. 3, and a sprocket 110, on the right, and a second, shorter spike chain 112 entrained about a sprocket 114, on the left, and another sprocket 116 positioned beneath and at the left of the pressure plate assembly 84. The drive motors (typically hydraulic) for the pusher chain 106 and the spike chain 112 are shown on opposite sides of the inverted plant 12 in FIG. 3. The pusher chain 106 is of the type used for the plant elevator 50 and is intended to engage the plant stems 66 and push the plant stems 66 leftward in FIG. 4 into the stem-accepting space between the pusher chain 106 and the spike chain 112. The spike chain 112 is of the type used for the plant elevator 50, that is, a link chain with spikes or tooth-like blade elements designed to impale the plant stem 66 of each tobacco plant 12 as it is transferred from the plant inverter assembly 82 to the lateral transfer assembly 104.

As the tobacco plant 12 is inverted by the plant inverter assembly 82, a portion of the plant stem 66 is forced by the pointed spikes 102 into the pusher chain 106. The pusher chain 106 engages the plant stem 66 and urges the inverted tobacco plant 12 to the left in FIG. 4 into the tooth-like projections 76 of the spike chain 112. The pressure plate 88 adjacent the trailing edge 100 can be bent toward the opposed pusher chain 106 and the spike chain 112 to ease the transition of the plant stem 66 into engagement with the chain surfaces. In the alternative, the trailing edge 100 of the pressure plate 88 can be generously bevelled to ease the transition of the plant stem 66 off the pressure plate 88. The stem 66 of the inverted tobacco plant 12 will continued to be impaled upon and supported in its inverted position by the pointed spikes 102 until the pusher chain 106 and the spike chain 112 have both engaged the stem 66 of the tobacco plant 12, the pusher chain 106 pulls the tobacco plant 12 from the pointed spikes 102.

A stick-loader assembly 120 is mounted on and extends from the side of the plant harvesting machine 10 opposite the plant elevator 50. As shown in FIGS. 1 and 3, the stick-loader assembly 120, during the harvesting operations, is supported in generally horizontal position by a support brace 122. The stick-loader assembly 120 is pivotally mounted to the side of the plant harvesting machine 10 by a pivot point 124 and can be folded downwardly against the side of the plant harvesting machine 10 when the machine in not in operation. The pivot-type mount allows the stick-loader assembly 120 to be stowed against the side of the plant harvesting machine 10 so that the machine can be driven through conventional garage door frames. The stick-loader assembly 120 includes a reciprocally mounted carriage 126 that can be moved between a rightmost position, as shown in FIG. 3, and a leftmost position. The carriage 126 is connected to a link-type chain 128 that is entrained about a left-side sprocket 130 and a right-side sprocket 132. One of the pulleys is connected to a conventional hydraulic motor (not shown) that is selectively controlled by the machine operator to drive the link-type chain 128 and its carriage 126 in one direction or the other. In the alternative, a push/pull hydraulic cylinder can be used to advance or retract the carriage 126.

Figure 9:
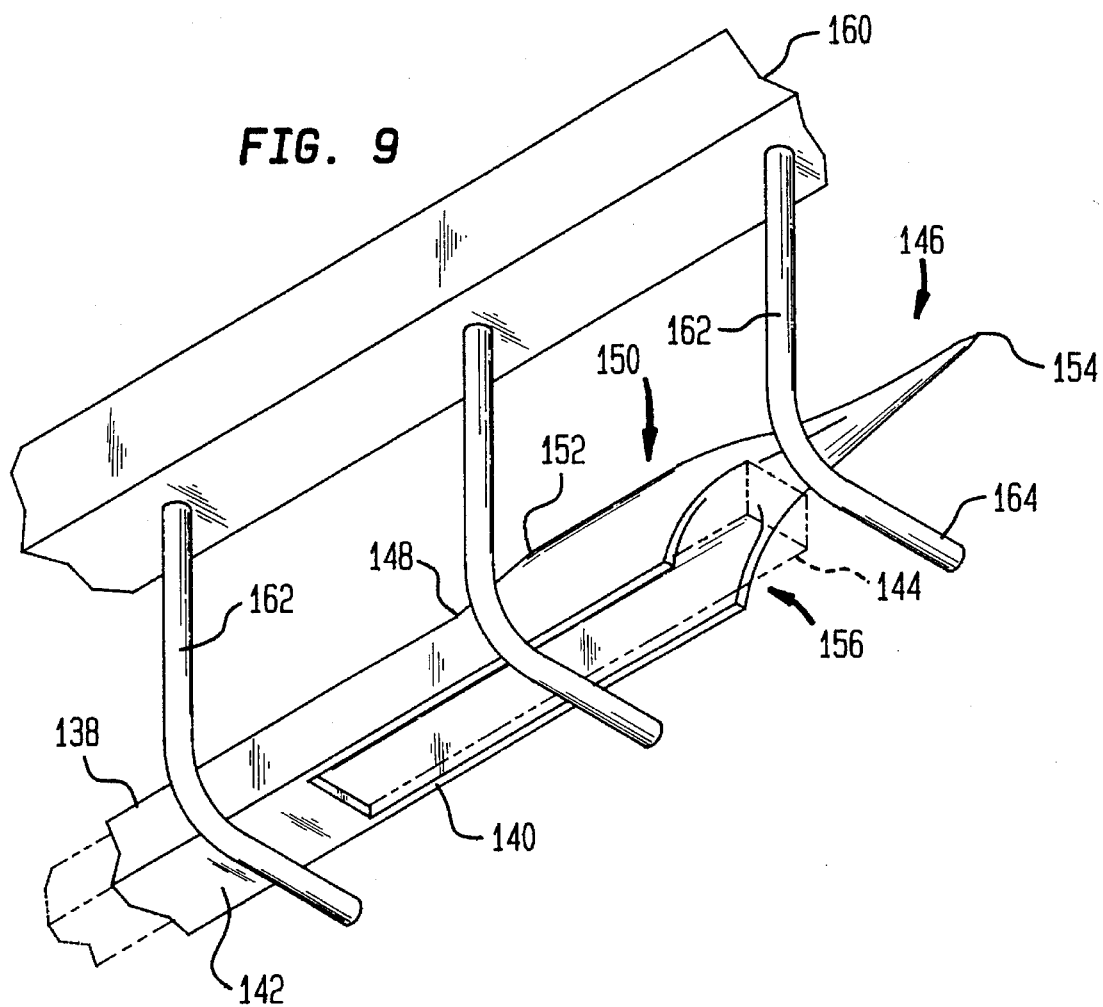
FIG. 9 is a perspective view of a spike point and stick (dotted-line illustration) supported on a portion of a suspension brackets.
Figure 10:
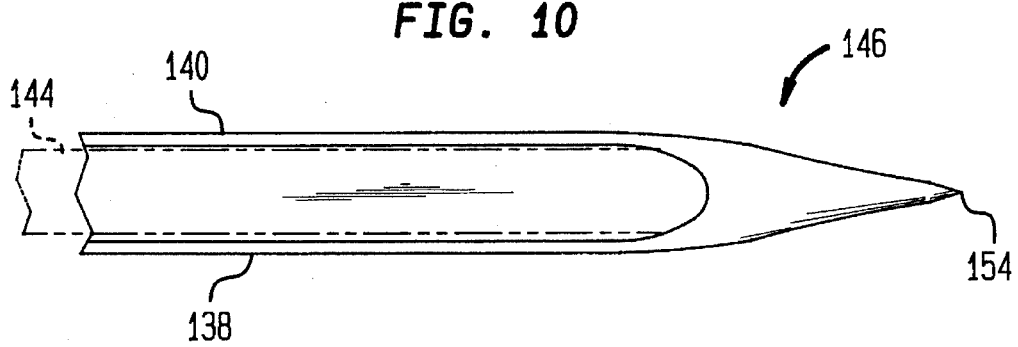
FIG. 10 is a view of a spike point mounted on a stick (dotted-line illustration)

A hollow stick-carrier 134 is mounted in a cantilevered fashion to the carriage 126 and is intended to be advanced to a rightmost position, as shown in FIG. 3, and a retracted, leftward position. The stick-carrier 134 includes an elongated bar-section 136 defined (FIGS. 9 and 10) by a side member 138 spaced from another side member 140 that are connected on the underside by one or more bottom supports 142 (FIG. 9). The side member 138 and side member 140 are spaced sufficiently apart so that a wooden stick 144, upon which the harvested tobacco plants 12 are eventually mounted, can be inserted between them by the machine operator. The elongated bar-section 136 is connected, at its leftward end, to the carriage 126 and includes, at its rightmost end, a spear-point-shaped spear-shoe 146. As best shown in FIGS. 9 and 10, the spear-shoe 146 at the end closest the lateral transfer assembly 104 has a rear portion 148 that is generally rectangular in transverse cross-section and which is dimensioned to accept the wooden stick 144. The rear portion 148 of the spear-shoe 146 transitions smoothly into an intermediate portion 150 that includes an enlarged, bulbous section 152. The intermediate portion 150 then transitions into a relatively long and thin point 154 that is designed and intended to penetrate the stem 66 of each inverted tobacco plant 12.

The wooden stick 144 is insertable in the stick-carrier 134 and is supported by one or more bottom supports 142 joining the side member 138 and side member 140. The wooden stick 144 is supported and carried by the stick-carrier 134 as the carriage 126 is advanced from its retracted position to its operational position in which the point 154 is positioned between the pusher chain 106 and the spike chain 112 of the lateral transfer assembly 104 (as shown in FIG. 3). When the stick-carrier 134 is retracted from its operational position, the wooden stick 144 abuts against a stationary portion of the carriage 126 and does not retract with the stick-carrier 134 but effectively exits the stick-carrier 134 via an under-the-point opening 156 (FIG. 9) as the stick-carrier 134 is retracted. Thus, retraction of the stick-carrier 134, in effect, ejects the wooden stick 144 from the stick-carrier 134 as explained more fully below.

The spear-shoe 146, in its operational position, is positioned immediately adjacent the lateral transfer assembly 104 and is designed so that each successive tobacco plant 12 is impaled upon and over the spear-shoe 146. As the tobacco plant 12 is pushed onto the spear-shoe 146 by the lateral transfer assembly 104, the point 154 penetrates the plant stem 66 with the bulbous section 152 enlarging the opening. The next successive tobacco plant 12, as it is impaled upon the spear-shoe 146 by the lateral transfer assembly 104, forces the previously impaled tobacco plant 12 over the bulbous section 152 and onto the rear portion 148. Subsequently impaled tobacco plant 12 then forces the previously impaled tobacco plants 12 onto the elongated bar-section 136. When a desired complement of tobacco plants 12 has been impaled upon the stick-carrier 134, the carriage 126 is retracted under operator control so that the stick-carrier 134 is retracted while the wooden stick 144 effectively remains relatively stationary. The stick-carrier 134 is thus withdrawn from the plant stem 66 through the previously formed openings with the wooden stick 144 continuing to remain in the previously formed openings. Thus, when the stick-carrier 134 is fully retracted, the impaled tobacco plants 12 will remain mounted on the wooden stick 144.

Figure 11:
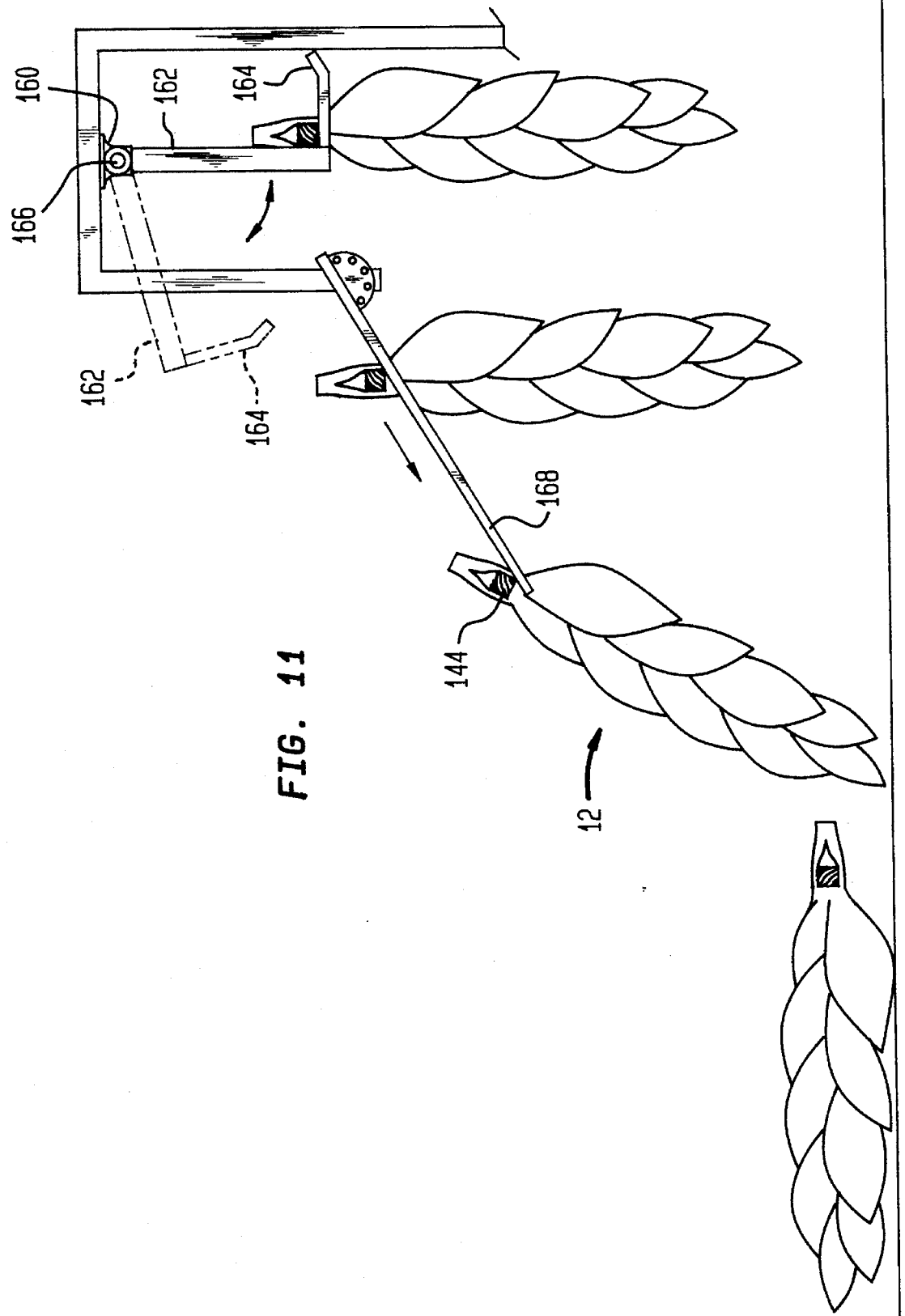
FIG. 11 is a diagrammatic illustration of a stick carry harvested tobacco plants being off-loaded from the plant harvesting machine.

A swing-arm assembly 158 (FIGS. 3, 4, and 11) includes a laterally aligned transom member 160 from which a plurality of "L"-shaped suspension brackets 162 depend, i.e., four suspension brackets 162 are shown in the various figures. As shown in FIG. 11, the distal ends 164 of the suspension brackets 162 are inclined upwardly. The swing-arm assembly 158 is rotatably mounted about a pivot axis 166 (FIG. 11) and selectively driven by a motor (not shown) for movement between its lowered position (solid-line illustration in FIG. 11) and an upper position (dotted-line illustration). As shown in FIGS. 3 and 9, the suspension brackets 162 are designed to support or 'cradle' a wooden stick 144 upon which the tobacco plants 12 are impaled. During the normal operational mode, the swing-arm assembly 158 is rotated clockwise in FIG. 11 so that the distal ends 164 of the suspension brackets 162 do not interfere with the impaling of plant stems 66 onto the stick-carrier 134. As shown in the rear view of FIG. 3, as many as five successive tobacco plants 12 can be impaled upon and spaced along the length of the wooden stick 144 so that the wooden stick 144 is fully loaded. When a full complement of tobacco plants 12 have been impaled upon the stick-carrier 134, the swing-arm assembly 158 is rotated so that the end portions of the suspension brackets 162 are positioned beneath the stick-carrier 134. The suspension brackets 162 are spaced apart to provide ample clearance therebetween for the tobacco plants 12 on the stick-carrier 134. As explained above, the wooden stick 144 and the complement of impaled tobacco plants 12, does not retract with the stick-carrier 134. As the stick-carrier 134 is retracted the impaled tobacco plants 12 will be substantially held in place by the suspension brackets 162 and will be prevented from moving with the stick-carrier 134 as it is retracted. The wooden stick 144 will remain above the suspension brackets 162 as the stick-carrier 134 is fully retracted. As the stick-carrier 134 is retracted, the wooden stick 144 will be supported or cradled by the suspension brackets 162.

The fully loaded wooden stick 144 is discharged from the plant harvesting machine 10 by controlling the drive motor (not shown) for the swing-arm assembly 158 to cause the swing-arm assembly 158 to rotate from its lowered position to its upper position. As the swing-arm assembly 158 rotates clockwise in FIG. 11, the fully loaded wooden stick 144 is carried rearwardly and upwardly by the suspension brackets 162. As the wooden stick 144 is carried upwardly, the wooden stick 144 slides forwardly on and off the distal ends 164 of the suspension brackets 162 and onto the rearwardly declining skid plates 168 attached to the frame of the plant harvesting machine 10. The fully loaded wooden stick 144 then slides along the skid plates 168 toward the ground surface. The lowermost portions of the inverted tobacco plants 12 eventually contact the ground surface with the wooden stick 144 sliding off the distal ends of the skid plates 168. The length of the skid plates 168 is such that the tobacco plants 12 are not placed in free-fall, i.e., the lowermost portion of the tobacco plants 12 contacts the ground surface before the wooden stick 144 slides off the ends of the skid plates 168. In general, the force with which the sticked tobacco plants 12 drop to the local ground level depends upon the length and angle of declination of the skid plates 168.

In normal operation, the machine operator operates the carriage 126 to retract the stick-carrier 134 and then inserts a wooden stick 144 into the retracted stick-carrier 134. Thereafter, the carriage 126 is operated to advance the carriage 126 (and the wooden stick 144) to the operative position with the point 154 of the spear-shoe 146 positioned to receive the plant stems 66 transferred by the lateral transfer assembly 104. The swing-arm assembly 158 is operated so that the suspension brackets 162 are clear of the tobacco plants 12 as they are impaled upon the spear-shoe 146. The plant harvesting machine 10 is driven along a row of tobacco plants 12 with successive tobacco plants 12 guided into the entry chute 62 and severed by the saw blade 64 as the plant stems 66 are gripped between the opposed spike chain 72 and spike chain 74 of the plant elevator 50. The severed tobacco plants 12 are carried upwardly and rearwardly in the plant elevator 50 and transferred to the plant inverter assembly 82. The pointed spikes 102 of the spike plate 86 engage the plant stem 66 and move the plant stem 66 across the leading edge 98 of the pressure plate 88 as the plant stem 66 is disengaged from the spike chain 72 and spike chain 74 of the plant elevator 50. The plant stem 66 is rotated about the pressure plate 88 with the pressure plate 88 resiliently accommodating to the plant stems 66 of differing size and shape. The inverted plant stem 66 then engages the pusher chain 106 which guides the inverted tobacco plant 12 into the space between the opposed pusher chain 106 and spike chain 112 of the lateral transfer assembly 104 as the inverted tobacco plant 12 is disengaged from the pointed spikes 102 of the spike plate 86. The inverted tobacco plant 12 is then forced by the pusher chain 106 and the spike chain 112 onto and over the spear-shoe 146. The next successive inverted tobacco plant 12 forces the previously impaled plants further along the elongated bar-section 136 until the full complement (typically five) is mounted on the elongated bar-section 136. The machine operator operates the swing-arm assembly 158 to position the suspension brackets 162 under the elongated bar-section 136. The operator then retracts the carriage 126 to withdraw and retract the elongated bar-section 136. The wooden stick 144 exits the retracting elongated bar-section 136 through the under-the-point opening 156 and falls onto the distal ends 164 of the suspension brackets 162. The operator then operates the swing-arm assembly 158 to position the wooden stick 144 and its complement of tobacco plants 12 over the skid plates 168. The wooden stick 144 then slides off the distal ends 164 of the suspension bracket 162 onto the skid plates 168 and eventually slides off the skid plates 168 onto the ground surface.

The present invention advantageously provides a plant harvesting machine that simply and efficiently harvests plants, particularly tobacco plants. While the best mode of the plant harvesting machine is intended for harvesting tobacco, other plants having characteristics similar to tobacco plants may likewise be harvested.

As will be apparent to those skilled in the art, various changes and modifications may be made to the illustrated plant harvesting machine of the present invention without departing from the spirit and scope of the invention as determined in the appended claims and their legal equivalent.

What is claimed is:

1. A plant harvesting machine comprising:

a chassis having ground-engaging drive means for advancing the machine along a ground surface having plants for harvesting;

means for severing the stem of a plant to be harvested;

means for transporting the severed plant from its initial position adjacent the ground surface to a second position spaced above the first position;

means for inverting a plant received from the transporting means and including a first rotatably mounted member having a plurality of stem griping elements and an opposed member opposite said first member;

means for resiliently biasing one of said members towards the other one for accommodating stems of different dimensions; and means for impaling the inverted plant upon a carrier stick.

2. The plant harvesting machine of claim 1, wherein said means for severing comprises a rotatable saw blade.

3. The plant harvesting machine of claim 1, wherein said means for transporting comprises first and second chains entrained about respective sets of pulleys for gripping the stem of a severed plant therebetween.

4. The plant harvesting machine of claim 1, wherein said means for inverting comprises:

a rotatable disc member having plural elements thereon for gripping the stem of a plant;

a second member opposite said disc member for constraining the stem of a plant therebetween; and means for resiliently biasing said second member in the direction of said rotatable disc, said second member resiliently biasing the stem of a plant therebetween against the plural elements of said disc member.

5. The plant harvesting machine of claim 4, wherein said plural elements comprise elongated spikes.

6. The plant harvesting machine of claim 4, wherein said second member further comprises a base plate having springs means thereon for resiliently biasing said second member toward said rotatable disc.

7. The plant harvesting machine of claim 1, wherein said means for impaling comprises a pointed spiker bar for receiving the stems of plants to be impaled thereon;

a pair of opposed spike-chains for receiving therebetween an inverted plant from said inverting means and for forcing the stem of the inverted plant onto and over the point of said spiker bar.

8. A plant harvesting machine comprising:

a chassis having ground-engaging drive means for advancing the machine along a ground surface having plants for harvesting;

means for severing the stem of a plant to be harvested;

means for transporting the severed plant from its initial position adjacent the ground surface to a second position spaced above the first position;

means for inverting a plant received from the transporting means and including a first rotatably mounted member having a plurality of stem griping elements and an opposed member opposite said first member;

means for impaling the inverted plant upon a carrier stick;

means for transferring the inverted planted from said inverting means to said impaling means;

said impaling means including an elongated sheath containing a carrier stick therein, said sheath having a pointed end thereof for penetrating a portion of the inverted plant.

9. The plant harvesting machine of claim 8, wherein said sheath is reciprocally mounted for movement between a retracted and operative positions, said carrier stick ejected from said sheath when said sheath is moved to its retracted position.

10. A plant inverter assembly for a plant harvesting machine, comprising:

a first discoidal plate mounted for rotation about an axis and having a plurality of spike-like elements extending from a face thereof;

a second plate presenting a substantially planar surface to said spike-like elements and spaced therefrom;

means for rotating said first plate about said axis of rotation;

means for resiliently biasing said second plate toward said first plate.

* * * * *